US007111585B2

(12) United States Patent
Hale et al.

(10) Patent No.: US 7,111,585 B2
(45) Date of Patent: Sep. 26, 2006

(54) PAW CLEANING DEVICE

(76) Inventors: Mary M. Hale, 148 S. Christine, Mt. Clemens, MI (US) 48043; Peter G. Duquet, 12121 Blue Heron, Shelby Township, MI (US) 48036

( * ) Notice: Subject to any disclaimer, the term of this patent is extended or adjusted under 35 U.S.C. 154(b) by 81 days.

(21) Appl. No.: 10/803,670

(22) Filed: Mar. 18, 2004

(65) Prior Publication Data
US 2004/0200432 A1 Oct. 14, 2004

Related U.S. Application Data

(60) Provisional application No. 60/474,468, filed on May 30, 2003, provisional application No. 60/461,670, filed on Apr. 8, 2003, provisional application No. 60/531,532, filed on Dec. 19, 2003, provisional application No. 60/528,786, filed on Dec. 11, 2003.

(51) Int. Cl.
*A01K 29/00* (2006.01)
(52) U.S. Cl. ..................... 119/652
(58) Field of Classification Search ............. 119/165, 119/169, 174, 526, 652; 604/358; 36/71; 15/215, 244.1, 244.3; 5/420, 603, 608, 652.1
See application file for complete search history.

(56) References Cited

U.S. PATENT DOCUMENTS

| | | | | |
|---|---|---|---|---|
| 1,220,441 | A * | 3/1917 | Mendel | 119/652 |
| 4,008,688 | A * | 2/1977 | Nicholas | 119/652 |
| 5,148,613 | A * | 9/1992 | Cullen | 34/81 |
| 5,279,237 | A * | 1/1994 | Alivizatos | 112/475.05 |
| 5,367,724 | A * | 11/1994 | Coccagna | 4/571.1 |
| 6,180,035 | B1 * | 1/2001 | Hsieh et al. | 15/244.3 |
| 6,199,240 | B1 * | 3/2001 | You | 15/220.1 |
| 6,256,831 | B1 * | 7/2001 | Chen | 15/244.3 |
| 6,463,885 | B1 * | 10/2002 | Laner | 119/652 |
| 6,578,520 | B1 * | 6/2003 | Otsuji et al. | 119/165 |
| 6,793,434 | B1 * | 9/2004 | Olson | 15/144.1 |
| 2003/0098267 | A1 * | 5/2003 | Page | 210/164 |
| 2004/0078909 | A1 * | 4/2004 | Coppa | 15/215 |
| 2005/0172908 | A1 * | 8/2005 | Belgiorno et al. | 119/166 |

FOREIGN PATENT DOCUMENTS

| JP | 11332485 A | * | 12/1999 |
|---|---|---|---|
| JP | 2000350668 A | * | 12/2000 |
| JP | 2001231701 A | * | 8/2001 |

* cited by examiner

*Primary Examiner*—Teri Pham Luu
*Assistant Examiner*—Elizabeth Shaw
(74) *Attorney, Agent, or Firm*—Fildes & Outland, P.C.

(57) ABSTRACT

The present invention provides a low cost paw cleaning device, which is capable of effectively washing an animal's paws, to prevent the tracking of dirt and mud through one's home. The device includes a basin, formed of plastic or rubber, for retaining a support layer and cleaning fluid. A permeable absorbent cover retained by the rim of the basin adjoins an upper portion of the support layer. As an animal walks across the device, the animal's paws contact the cover and compress or displace the support layer, thereby causing the cover and the support layer to conform with the crevices and contours of the animal's paws and locally moisten the animal's paws to remove dirt and debris therefrom.

15 Claims, 4 Drawing Sheets

PAW CLEANING DEVICE

This application claims benefit of the Apr. 8, 2003 filing date of provisional U.S. patent application No. 60/461,670, the May 30, 2003 filing date of provisional U.S. patent application No. 60/474,468, the Dec. 11, 2003 filing date of provisional U.S. patent application No. 60/528,786 and the Dec. 19, 2003 filing date of provisional U.S. patent application No. 60/531,532.

TECHNICAL FIELD

This invention relates generally to animal washing devices and, more particularly, to a device for cleaning the paws of an animal positioned thereon.

BACKGROUND OF THE INVENTION

One major problem with owning dogs or cats is that their paws tend to carry dirt and mud into one's home. In order to prevent dirt and mud from being tracked through one's home, the animal's paws must be cleaned before permitting the animal to enter the home. A current method of cleaning an animal's paws includes manually washing each paw by hand with water and a towel.

A low cost paw cleaning device capable of passively cleaning an animal's paws before the animal is allowed to enter one's home is desired.

SUMMARY OF THE INVENTION

The present invention provides a low cost paw cleaning device capable of effectively washing an animal's paws, to prevent the tracking of dirt and mud through one's home.

The invention includes a basin, formed of plastic or rubber, having a bottom wall with an upstanding peripheral rim extending upward from the bottom wall and defining a holding area for retaining cleaning fluid. A support layer is disposed within the holding area. A permeable absorbent cover, formed of terry cloth, adjoins an upper portion of the support layer and is retained by the rim of the basin.

In an exemplary embodiment, the support layer is formed of a sponge or foam like material, which is compressible and able to hold an adequate amount of cleaning fluid, such as water or soapy water, to clean an animal's paws.

In another embodiment, the support layer is formed of small polished stones or other suitable displaceable materials such as pebbles or plastic beads. If desired, the small polished stones of the support layer may be encased in an open meshed fabric bag to retain the stones within the holding area.

In yet another embodiment, the bottom wall of the basin has a plurality of indentations to provide drainage passages operative to carry cleaning fluid through a plurality of drainage openings extending through the bottom wall of the basin to allow excess cleaning fluid to drain from the holding area of the basin. In addition, drainage openings may also be formed through the peripheral rim to further drain excess fluid from the basin. If desired, stoppers may be attached to the bottom wall of the basin to temporarily seal the openings and prevent the leakage of cleaning fluid.

If desired, grip tape may be applied to the lower surface of the bottom wall of the basin to provide additional grip between the basin and a resting surface to prevent slippage of the basin. Additional grip tape may also be applied to the upper surface of the bottom wall to provide grip between the basin and the support layer to maintain the position of the support layer within the basin.

In operation, the device is positioned near an exterior door of a house, in a position similar to a doormat to allow an animal to walk on the device before entering or while entering the house. As the animal walks on the device, the cover initially engages the animal's paws to remove surface dirt and debris from the animal's paws. When the cover is moistened with a cleaning solution such as water, the contact between the animal's paws and the cover dampens or moistens the animal's paws to help remove additional dirt and debris. As the animal's weight is transferred through the cover to the support layer, the support layer locally displaces or compresses around the animal's paws causing the cover and the support layer to conform to the crevices and contours of the animal's paws. This increased contact between the animal's paws and the cover allows additional dirt and debris to be removed from within the crevices of the animal's paws.

These and other features and advantages of the invention will be more fully understood from the following description of certain specific embodiments of the invention taken together with the accompanying drawings.

DESCRIPTION OF THE PREFERRED EMBODIMENT

Figure 1:
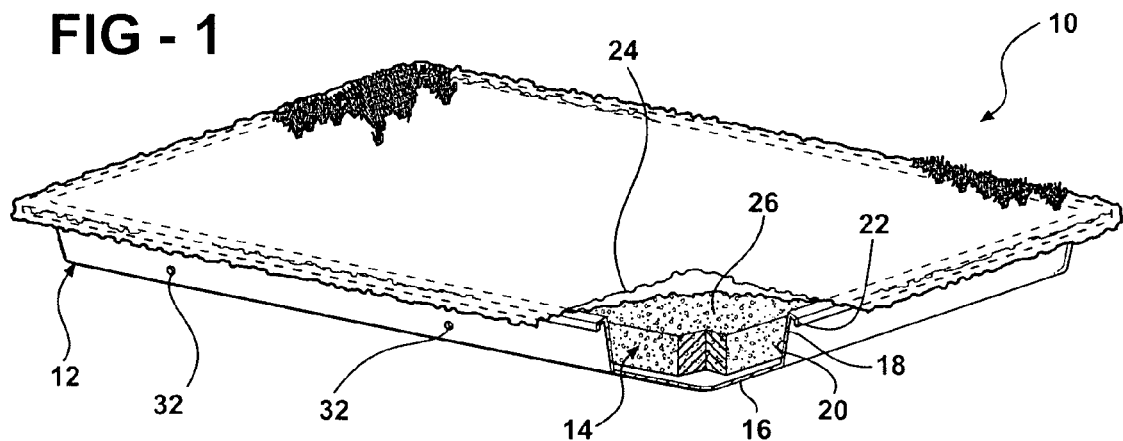
FIG. 1 is a pictorial partially cut away view of a paw cleaning device according to the present invention.

Referring now to FIG. 1 of the drawings in detail, numeral 10 generally indicates a paw cleaning device for washing an animal's paws. The device 10 includes a basin 12, formed of plastic or rubber, for retaining cleaning fluid and a support layer 14. The basin 12 has a bottom wall 16 having an upturned peripheral rim 18 extending upward from the bottom wall to define a holding area 20 for retaining cleaning fluid and the support layer 14. A flange extends outward and downward from a peripheral edge of the rim 18 to create a peripheral lip 22 surrounding the periphery of the basin 12. A permeable absorbent cover 24, formed of terry cloth, is retained around the peripheral rim 18 by the peripheral lip 22 and adjoins an upper portion 26 of the support layer 14.

Figure 2:
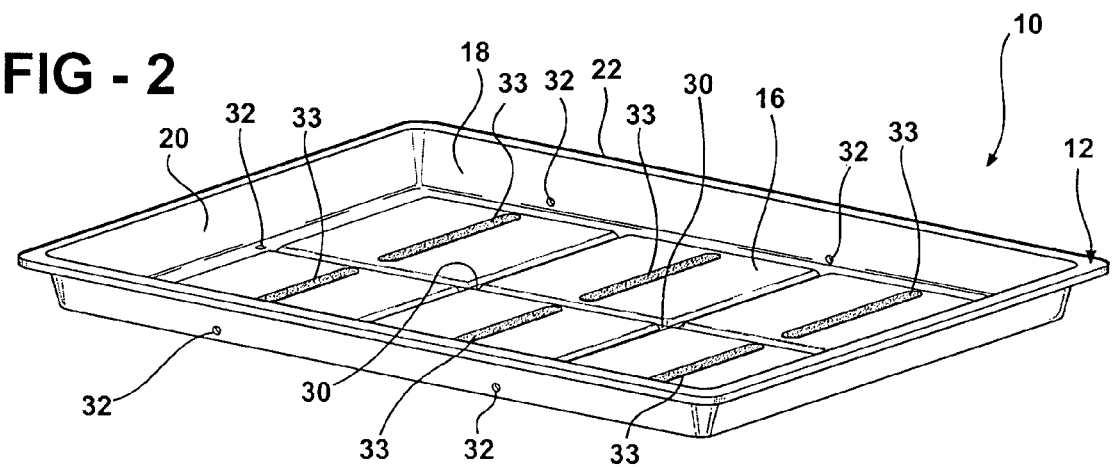
FIG. 2; is a pictorial view of the interior of the basin of the paw cleaning device of FIG. 1.

If desired, the bottom wall 16 of the basin 12 may have a plurality of indentations to form drainage passages 30 operative to carry cleaning fluid through a plurality of optional drainage openings 32 extending through the bottom wall 16 to allow excess cleaning fluid to drain from the holding area 20 of the basin 12, as illustrated in FIG. 2. Optional drainage openings 32 may also extend through the peripheral rim 18 to allow additional cleaning fluid to drain through the rim of the basin 12. However, it should also be understood that the basin 12 may also be formed free of drainage openings to provide a water tight holding area 20.

Optional grip tape 33 may be applied to an upper side of the bottom wall 16 to provide additional grip between the basin 12 and the support layer 14.

Figure 3:
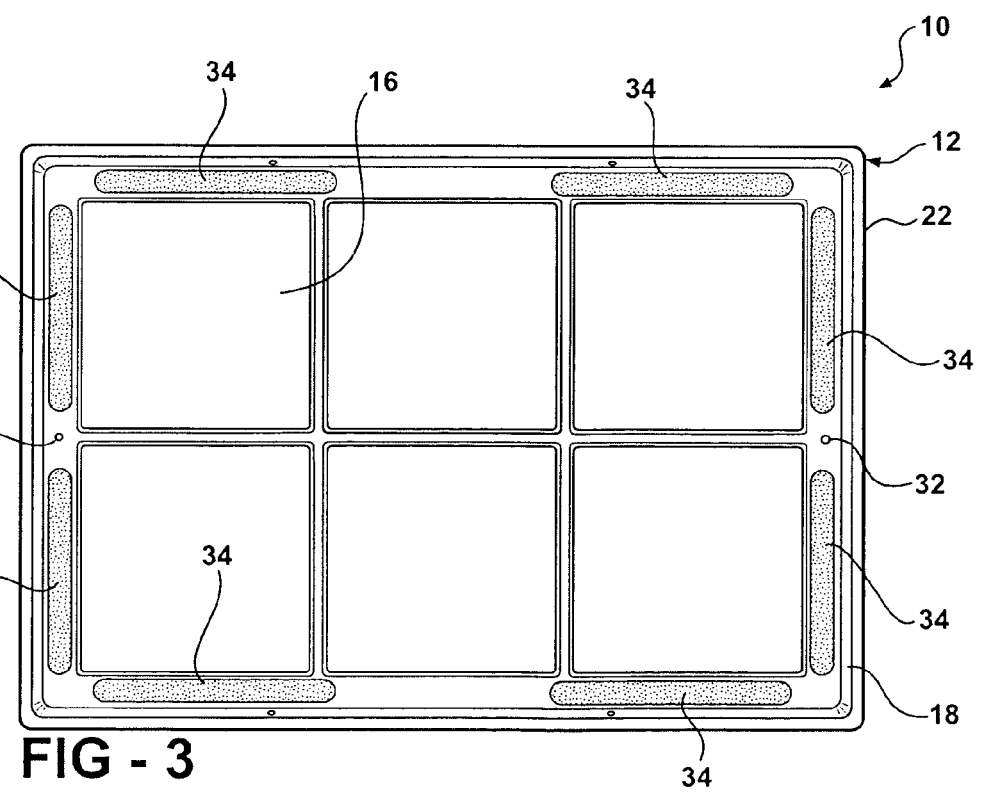
FIG. 3 is a bottom view of the paw cleaning device of FIG. 1.

Referring now to FIG. 3 showing the underside of the basin 12, grip tape 34 is applied to the lower surface of the bottom wall 16. The grip tape 34 provides additional grip between the basin 12 and a resting surface to prevent slippage of the basin 12.

In an exemplary embodiment, the size of the basin 12 is approximately 20 inches by 30 inches with a depth of approximately 1 inch. However, the device 10 can be of any suitable size, depending upon the size of the animal and the distance between the animal's paws. The basin 12 should be at least long enough so that each of the animal's paws makes contact with the device 10 at least once before the animal walks beyond the device. Preferably, the thickness of the support layer 14 is about equal to the height of the peripheral rim 18.

Referring again to FIG. 1, the support layer 14 is formed of a sponge or foam like material such as flexible polyether or polyester polyurethane foam, which is able to hold an adequate amount of cleaning fluid, such as water or soapy water, to moisten an animal's paws.

The cover 24 is formed of terrycloth or similar material and provides an absorbent cleaning surface for an animal's paws. The cover 24 may be formed of cotton or other natural or synthetic materials. Furthermore, the cover 24 is preferably sized slightly larger than the peripheral rim 18 of the basin 12 so that it completely covers the upper surface 26 of the support layer 14 and can be stretched over the peripheral rim and retained by the peripheral lip 22.

Figure 4:
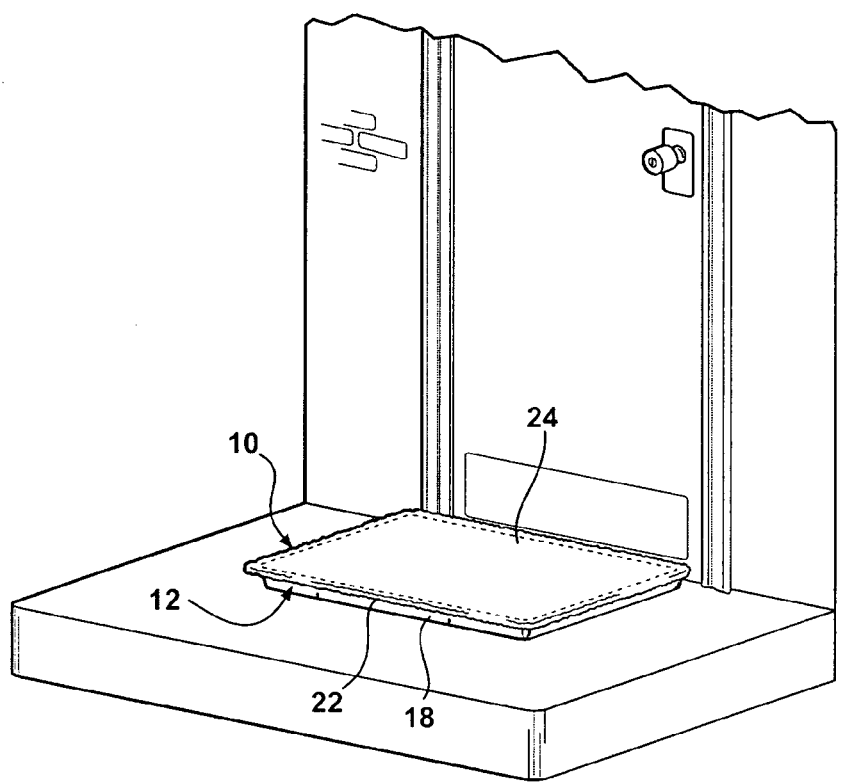
FIG. 4 is a pictorial view of the device of FIG. 1 positioned near an exterior door of a house.

In operation, the paw cleaning device 10 may be positioned, in a manner similar to a doormat, near an exterior door of a house, as shown in FIG. 4. The positioning of the device relative to the door should force the animal to walk on the device 10 immediately before or after entering the house.

Alternatively, the device 10 may be positioned, in a manner similar to a doormat, within a house near an exterior door to force the animal to walk over the device while entering the house. However, if the device 10 is positioned within the house, the basin 12 should be sealed to retain the cleaning fluid within the holding area 20.

Typically, rain water provides enough fluid to adequately wet the support layer 14 and the cover 24 of the device 10. However, if the support layer 14 or cover 24 of the device 10 becomes dry, cleaning fluid, such as water, can be poured over the cover 24 and subsequently drained through the support layer 14 into the holding area 20 of the basin 12. As the cleaning fluid is poured into the device 10, the support layer 14 and the cover 24 retain a portion of the fluid. Any excess fluid not held within the cover 24 or the support layer 14 drains from the holding area 20 through the drainage openings 32. If desired a small amount of mild hand soap may be added to the holding area 20 or the cover 24 to further aid in the cleaning of the animal's paws.

Figure 5:
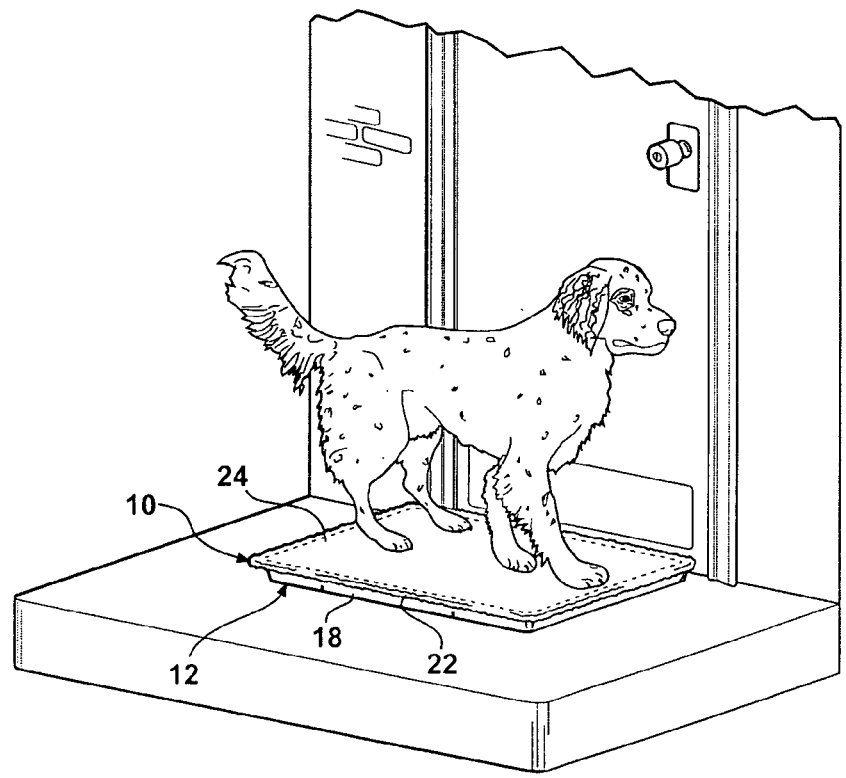
FIG. 5 is a pictorial view of an animal walking across the device of FIG. 1.

As an animal enters the house through the exterior door, the animal walks on the device 10, as shown in FIG. 5. As the animal walks on the device 10, the cover 24 initially engages the animal's paws to remove any surface dirt and debris from the animal's paws.

Figure 6:
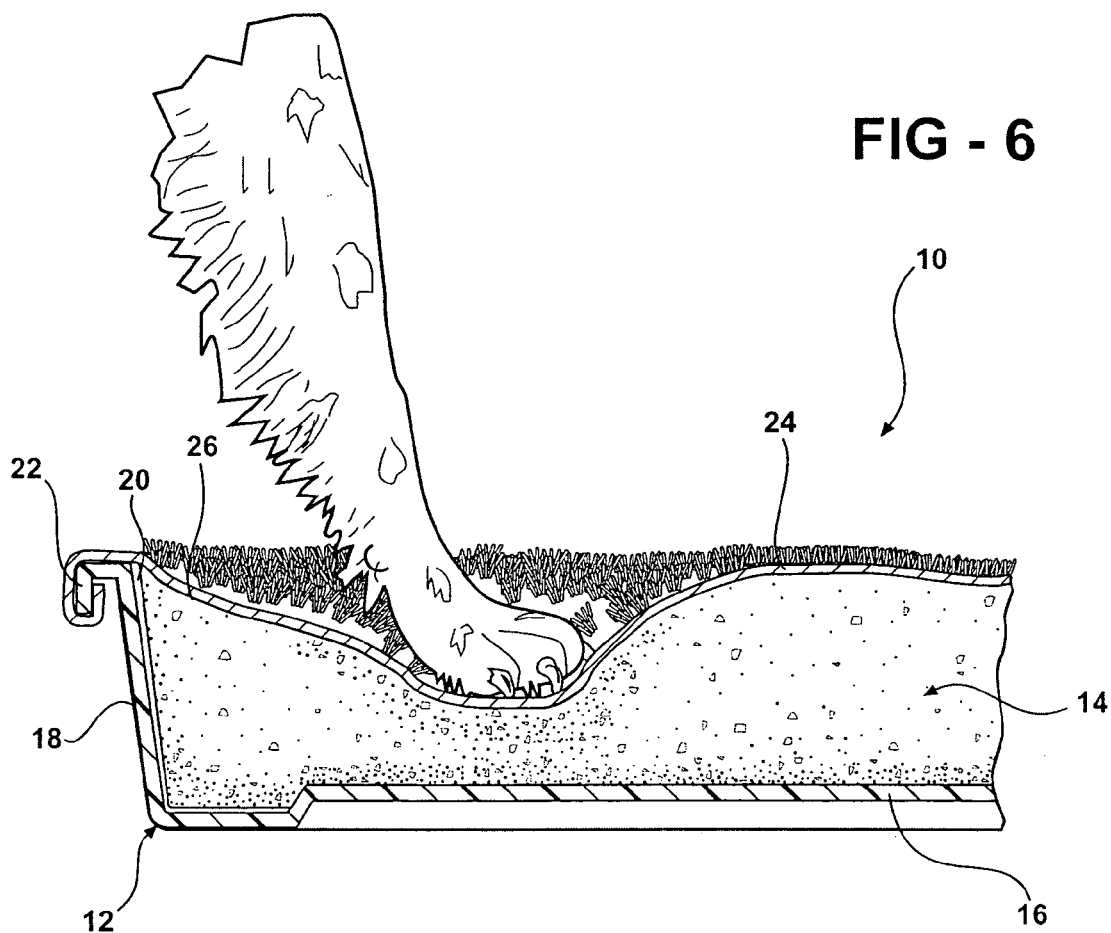
FIG. 6 is a diagrammatic sectional view through the paw bath of FIG. 1.

When the cover 24 is moistened with a cleaning solution such as water, the contact between the animal's paws and the cover 24 dampens or moistens the animal's paws to help remove additional dirt and debris. As the animal's weight is transferred through the cover 24 to the support layer 14, portions of the support layer locally compress or displace around the animal's paws causing the cover 24 and support layer 14 to conform with the crevices and contours of the animal's paws, as shown in FIG. 6. This increases the contact between the animal's paws and the cover 24, which allows additional dirt and debris to be removed from within the crevices of the animal's paws.

When cleaning solution is retained by the support layer 14, a portion of the solution is transferred from the support layer to the cover 24 to provide additional cleaning fluid around the animal's paws.

Figure 7:
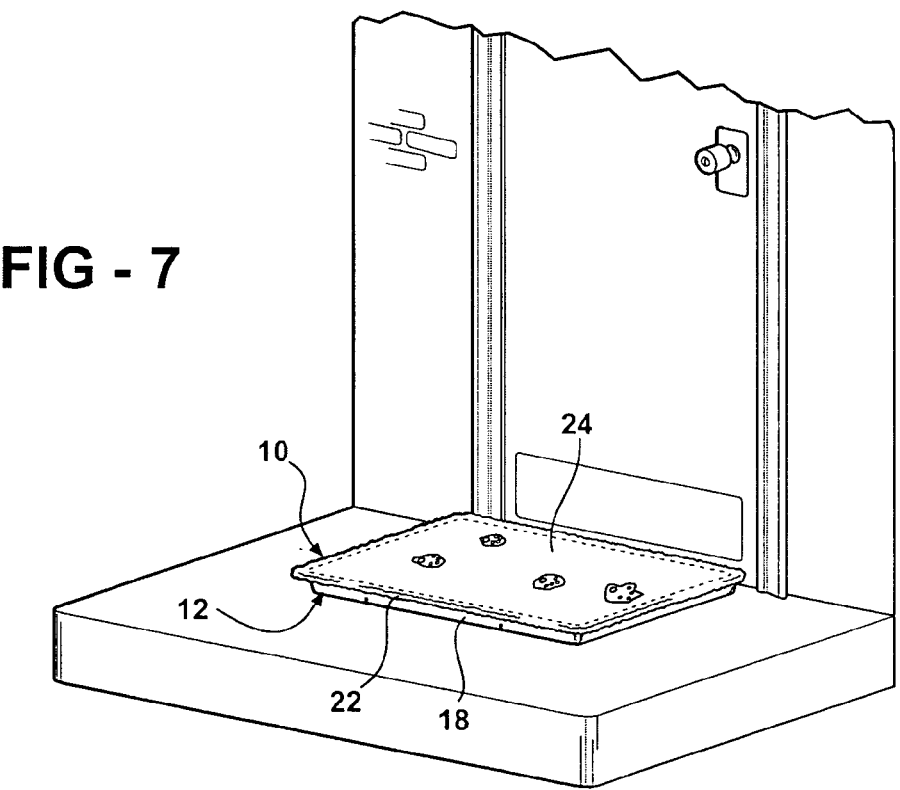
FIG. 7 is a pictorial view of the device of FIG. 1 after the animal enters a house.

As the animal moves around on the device 10, the animal's paws are further washed each time the animal's paws contact the cover 24. After the paws of the animal are adequately washed by stepping on the device 10, the animal can enter the house with clean paws and avoid tracking in dirt or mud as shown in FIG. 7.

Figure 8:
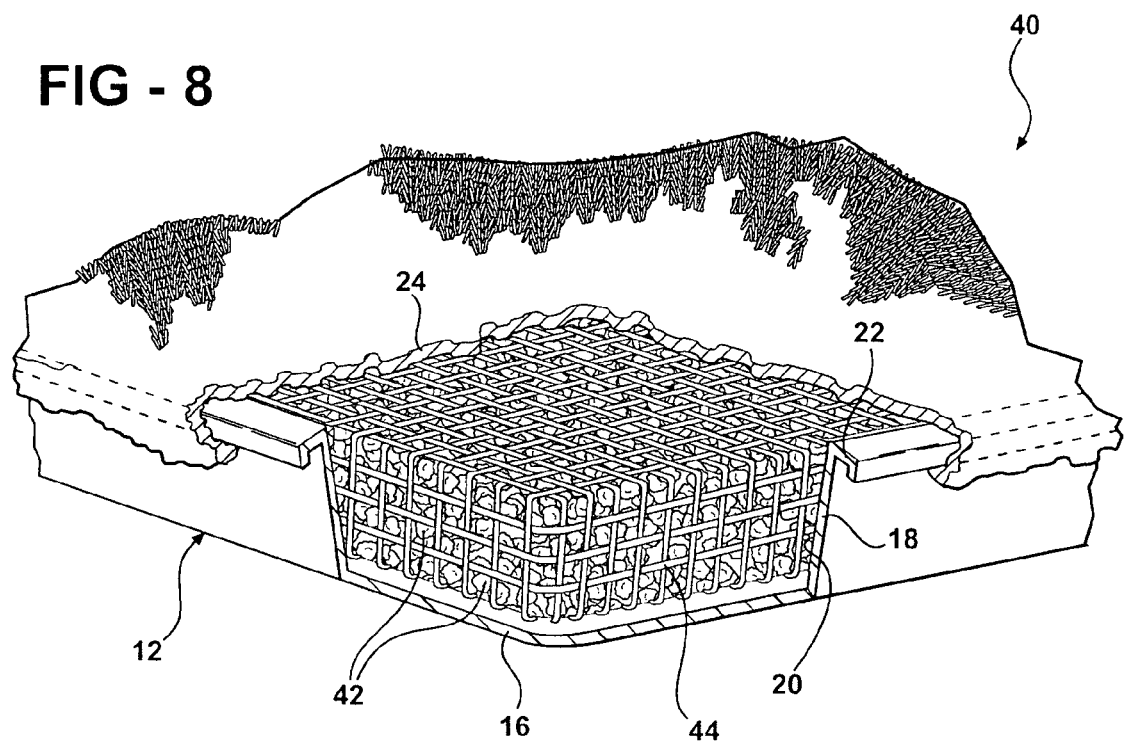
FIG. 8 is a pictorial partially cut away view of a paw cleaning device according to an alternative embodiment of the present invention.

FIG. 8 illustrates a paw cleaning device 40 similar to paw cleaning device 10, wherein like numerals indicate like parts. The holding area 20 of the basin 12 contains a support layer 42 formed of polished stones or other suitable displaceable materials such as pebbles or plastic beads. The stones of the support layer 42 should be small enough to locally displace when stepped upon by an animal's paw. If desired, the stones of the support layer 42 may be encased in an optional open meshed fabric bag 44 to retain the support layer within the holding area 20. The openings in the mesh bag 44 should be small enough to retain the stones of the support layer 42 but large enough to allow cleaning solution to run through the mesh bag and the support layer.

Depending upon the type of stone, the support layer 42 may retain a minimal amount of cleaning solution, particularly between the stones and on the surface of the stones, to provide moisture for the cover 24 when the device 10 is stepped upon.

Figure 9:
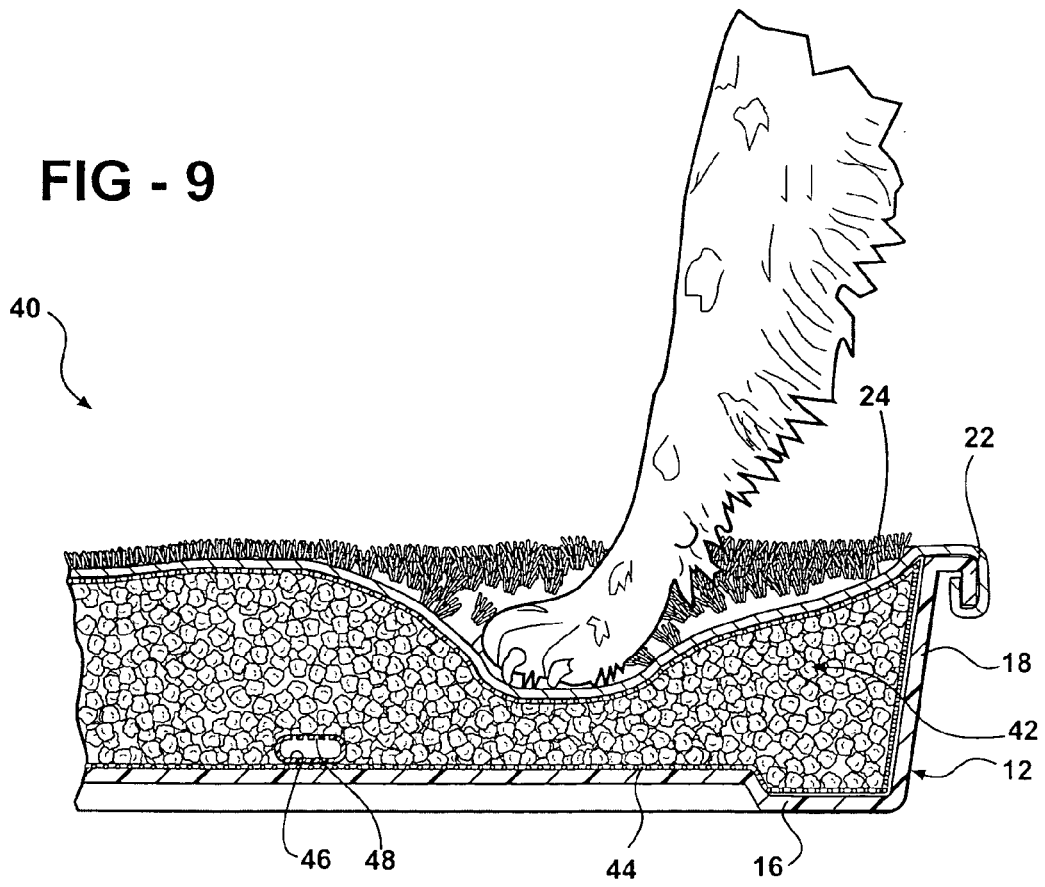
FIG. 9 is a diagrammatic sectional view through the paw bath of FIG. 8.

In operation, device 40 functions similar to device 10 in that the support layer 42 displaces around the animal's paws to increase contact between the cover 24 and the animal's paws, as shown in FIG. 9.

If desired, an optional hose 46 having a plurality of openings 48 spaced along the length of the hose to provide cleaning fluid flow over the length of the hose, may be fitted into the holding area 20 of the basin 12. An end of the hose, not shown, adapted to be connected to a water source, extends out of the paw cleaning device. As needed, cleaning fluid from the water source may delivered through the hose 46 to the support layer 42 and the holding area 20 to provide cleaning solution for the support layer and the holding area. When the paw cleaning device 40 becomes dirty, from repeated use, cleaning fluid may be continuously delivered through the hose 46 to flush any dirt and debris from the paw cleaning device through the drainage openings.

In any of the previously described embodiments, if the cover 24 becomes dirty over time from repeated use, the cover may be removed from the basin 12 and cleaned separately. If the support layer 14, 42 becomes dirty from repeated use, it may be rinsed within the basin to remove any dirt or debris therefrom. After the cover 24 and support layer 14, 42 are adequately cleaned, the device 10 may be reassembled by reattaching the cover 24 over the basin 12.

If the cleaning fluid becomes dirty from collecting dirt and debris from the animal's paws, the dirty fluid may be flushed out of the device 10. This is accomplished by pouring new cleaning fluid into the device 10 and allowing the dirty cleaning fluid to drain through the drainage openings 32. After the dirty cleaning solution is adequately rinsed from the device 10, any excess cleaning solution is directed out of the holding area 20 through the drainage openings 32 by the drainage passages 30.

If desired optional drain stops, not shown, may be used to seal the drainage openings 32. When drain stops are used to seal the basin, the cleaning fluid can be drained from the holding area 20 by removing the drain stops from the bottom wall 16 of the basin 12 to allow the cleaning fluid to flow through the drainage openings 32. As the cleaning fluid drains through the drainage openings 32, the drainage passages 30 help to direct the dirty cleaning fluid toward the drainage openings 32. After the cleaning fluid is adequately drained from the holding area 20 of the basin 12, the drain stops can be reapplied to the basin 12, thereby sealing the basin to allow the holding area 20 of the basin 12 to be refilled with fresh cleaning solution.

When drainage openings 32 are not present in the basin, the cleaning fluid may be removed from the holding area 20 by tipping the basin 12 and pouring the cleaning fluid out over the peripheral rim 16.

While the invention has been described by reference to certain preferred embodiments, it should be understood that numerous changes could be made within the spirit and scope of the inventive concepts described. Accordingly, it is intended that the invention not be limited to the disclosed embodiments, but that it have the full scope permitted by the language of the following claims.

The invention claimed is:

1. An animal paw cleaning device comprising:
   a basin of one of a plastic and rubber material having a bottom wall and an upstanding peripheral rim extending upward from the bottom wall to define a holding area;
   a support layer of one of a compressible and displaceable material disposed within the holding area of the basin adapted to conform to contours of a paw and retain cleaning fluid; and
   a permeable absorbent cover adapted to retain dirt and debris adjoining substantially an upper portion of the support layer;
   wherein the cover is removably attached to the peripheral rim.

2. A device as in claim 1 including cleaning fluid retained within the holding area and the support layer.

3. A device as in claim 2 wherein the support layer releases cleaning fluid to moisten the cover during compression.

4. A device as in claim 3 wherein the cover is operative to moisten and clean debris from an animal's paws.

5. A device as in claim 2 wherein the cleaning fluid is water.

6. A device as in claim 2 wherein the cleaning fluid is a mixture of soap and water.

7. A device as in claim 1 including at least one drainage opening extending through the bottom wall of the basin.

8. A device as in claim 7 wherein the bottom wall has a plurality of drainage passages operative to carry fluid to at least one of said drainage openings.

9. A device as in claim 1 wherein the permeable cover is terry cloth.

10. A device as in claim 1 wherein the support layer is pebbles.

11. A device as in claim 10 wherein the pebbles of the support layer are contained within a mesh bag.

12. A device as in claim 1 wherein the support layer is foamed plastic.

13. A device as in claim 1 wherein the support layer is a sponge.

14. A device as in claim 1 including grip tape positioned between the support layer and the basin, the tape being operative to reduce sliding of the support layer retained within the holding area of the basin.

15. A device as in claim 1 including grip tape positioned on a lower surface of the basin and operative to reduce sliding of the basin upon a resting surface.

* * * * *